United States Patent
Hill

[11] 3,936,181
[45] Feb. 3, 1976

[54] COPYING MACHINES

[75] Inventor: Frank Arthur Hill, New Radnor, Wales

[73] Assignee: Ozalid Group Holdings Limited, Loughton, England

[22] Filed: Oct. 10, 1973

[21] Appl. No.: 405,081

[30] Foreign Application Priority Data
Sept. 26, 1972  United Kingdom............ 44337/72

[52] U.S. Cl............................. 355/14; 271/227
[51] Int. Cl.²............................... G03G 15/00
[58] Field of Search .......... 355/3, 14; 271/227, 229

[56] References Cited
UNITED STATES PATENTS
| | | |
|---|---|---|
| 3,343,450 | 9/1967 | Glaser et al..................... 355/14 X |
| 3,360,262 | 12/1967 | Kekopoulos et al................ 271/227 |
| 3,578,861 | 5/1971 | Kobayashi........................ 355/14 X |
| 3,603,446 | 9/1971 | Maxey........................... 271/227 X |

Primary Examiner—Richard M. Sheer
Attorney, Agent, or Firm—Cushman, Darby and Cushman

[57] ABSTRACT

A photocopying machine including a device for reorientating an original circulating through the machine for multiple copying. The device consists of a row of microswitches extending transversely to the direction of travel of the original, each microswitch being arranged, when contacted by the sheet before another sheet, to apply a brake to the sheet at a location behind it until the sheet has been reorientated sufficiently to contact other microswitches.

3 Claims, 5 Drawing Figures

COPYING MACHINES

The invention relates to sheet feeding and orienting devices and to copying machines including such sheet feeding devices.

It has been found in sheet feeding devices in which a sheet of material is transported between a feed region and a delivery region, that, inspite of all precautions, the sheet may become disorientated from a pre-determined orientation. This is a particular problem in copying machines which include such a sheet feeding device in a transfer region in which, in the case where a plurality of copies are required, the document is returned for re-circulation through the machine. If the document is not correctly orientated, it will not be correctly mated with copy paper and an unsatisfactory copy will be produced.

It is an object of the invention to mitigate such disadvantages.

Accordingly, a first aspect of the invention provides a sheet feeding and orienting device which accepts a sheet of material at a feed region thereof and transports it to a delivery region wherein a plurality of sensors are located between the feed and delivery regions and are associated with braking means, the sensors being so arranged that the leading edge of a sheet whose orientation differs from a pre-determined orientation activates a sensor to operate the braking means which so contacts the sheet that the sheet is re-orientated to said predetermined orientation whereupon the braking means become inoperative.

According to a second aspect of the invention there is provided a copying machine comprising an entry region in which a document to be copied is fed and in which the document is mated with a sheet of copying paper of similar size, a copy region in which an image of the document is transferred to the copying paper, a separating region in which the copying paper is separated from the document and subsequently developed and delivered and a transfer region in which, in the case where a plurality of copies are required, the document is returned to the entry region wherein the transfer region includes a sheet feeding and orienting device of the kind described above with the feed region of the device accepting the document from the separating region and the delivery region of the device delivering the document to the entry region.

The following is a more detailed description of one embodiment of the invention, by way of example, reference being made to the accompanying drawings in which.

Figure 1:
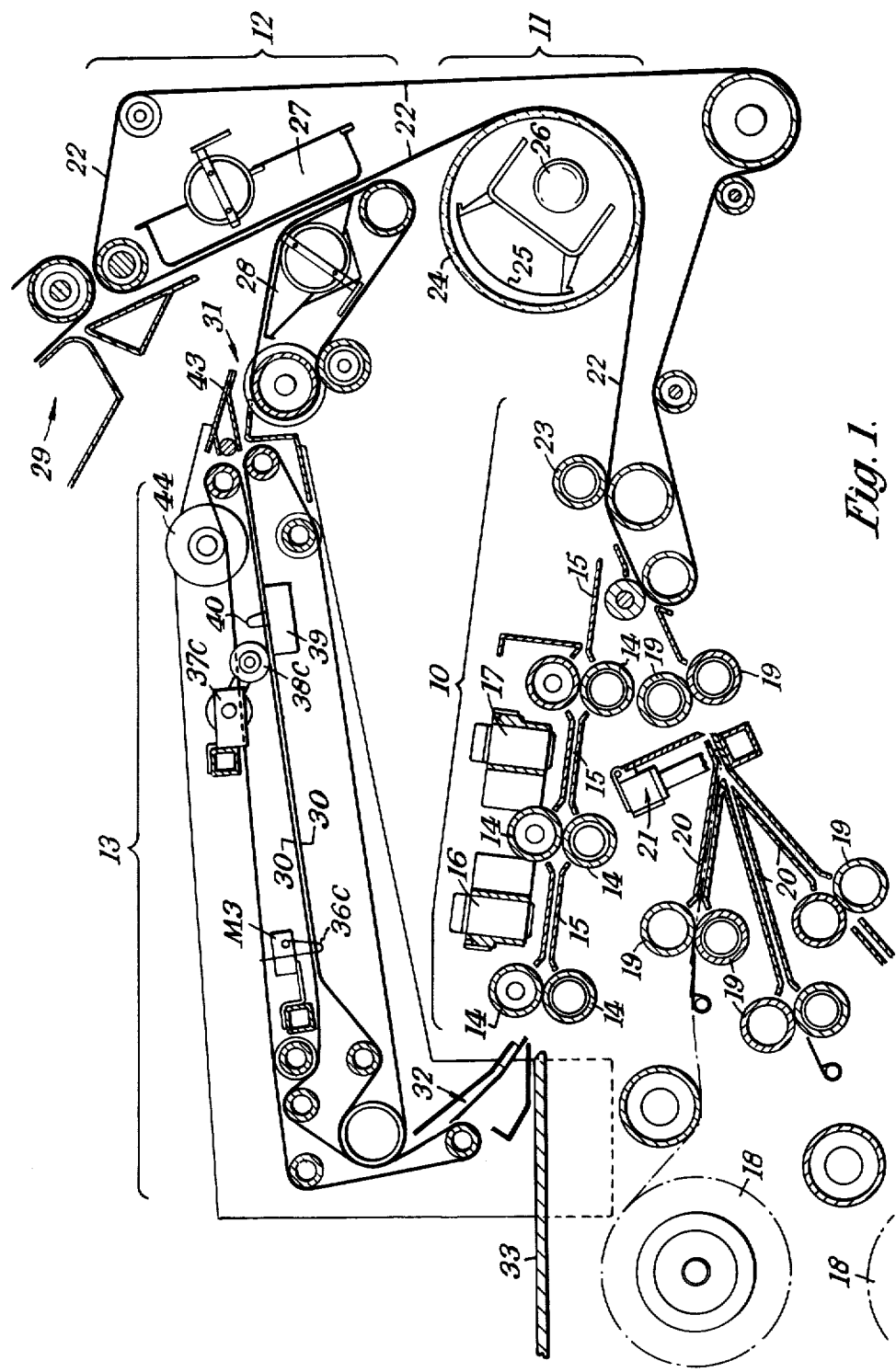
FIG. 1 is a schematic partial elevational cross-section of a copying machine.

Referring first to FIG. 1, the machine comprises an entry region 10, a copy region 11, a separating region 12 and transfer region formed by a sheet feeding device 13.

The entry region 10 comprises a table 33 leading to feed rollers 14 and path guides 15 for a document to be copied. A first photocell 16 and a second photocell 17 are mounted above the path guides 15. A number of reels of copy paper of various widths are mounted below the table 13 and two of them are indicated at 18. Each reel 18 has a pair of feed rollers 19 and a copy paper guide 20 associated therewith. The copy paper guides merge and pass a solenoid operated guillotine 21 connected to the second photocell 17. The document path and the paper paths merge at a nip between a conveyor 22 and a feed roller 23.

The copy region 11 includes a glass drum 24 within which is mounted a reflector 25 and a light source 26. The conveyor 22 passes around a portion of the surface of the drum 24. The separation region 12 comprises upper and lower suction devices 27,28, each arranged to apply suction to a sheet of paper passing adjacent thereto. This region also includes a developing assembly 29.

The sheet feeding device 13, which will be described in more detail below comprises a plurality of pairs of conveyor belts 30 arranged with adjacent runs forming a conveying nip therebetween. The plurality of pairs of conveyor belts 30 are arranged in parallel and side-by-side relation and lead from a feed region 31 adjacent the lower suction device 28 to a delivery region 32 adjacent the entry region 10. A pivotable deflector 43 is provided at the feed region.

The operation of the machine will now be described before a more detailed description of the sheet feed device 13 is given. A generally rectangular sheet document constituting an original to be copied is placed on the table 33 and inserted into the feed rollers 14 which conveys it beneath the photocells 16,17. When the first photocell 16 detects the leading edge of the document a prepare signal is sent to the feed rollers 19 of the reel of copy paper 18 of the appropriate width. When the second photocell 17 detects the leading edge of the document, the copy paper 18 is fed up the copy paper guide 20 to be mated with the document at the nip between the conveyor 22 and the feed roller 23.

The first photocell 16 produces a signal when the trailing edge of the document passes. This signal operates the guillotine solenoid to cause the guillotine 21 to sever the copy paper at a length equal to the length of the document.

The mated copy paper and document then pass around the glass drum 24 and the light source 26 transfers an image of the document to the copy paper. The conveyor 22 transports the document and exposed copy paper to the separating region 12. The upper suction device 27 applies suction to the copy paper and the lower suction device 28 applies suction to the document to separate the two. The copy paper passes to the developing assembly 29 where the image is developed and the completed copy delivered.

If a further copy is required the deflector 43 assumes an open position, as shown in FIG. 1, and permits the document to be transported by the conveyor belts 30 and re-presented to the feed rollers 14 of the entry region 10. The document always travels with one edge adjacent the edge 50 of the device 13. If no further copies are required the deflector 43 assumes a lower, closed, position and the document is ejected by the rollers 44.

Figure 2:
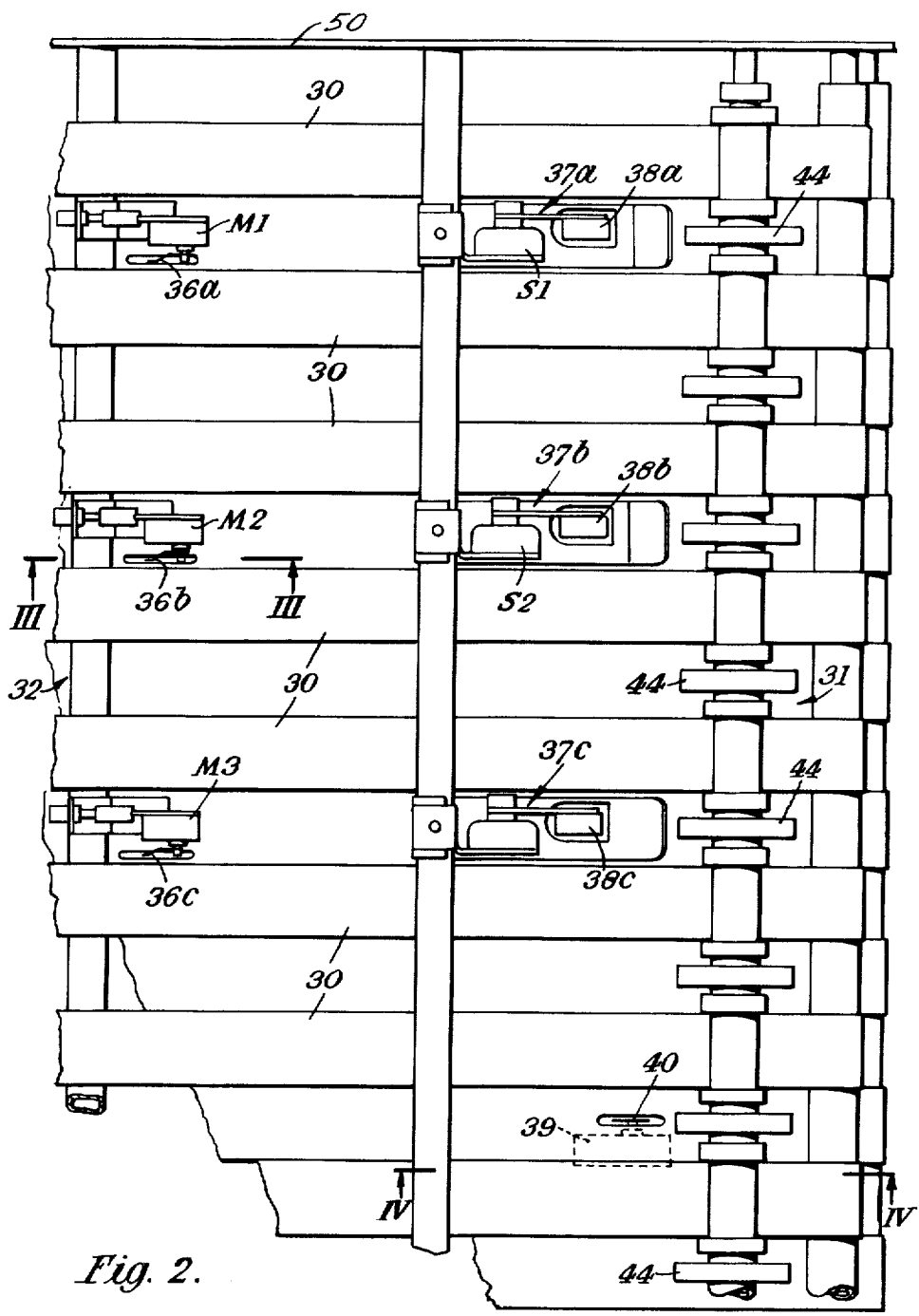
FIG. 2 is a schematic partial plan view of a sheet feeding device of the copying machine.
Figure 3:
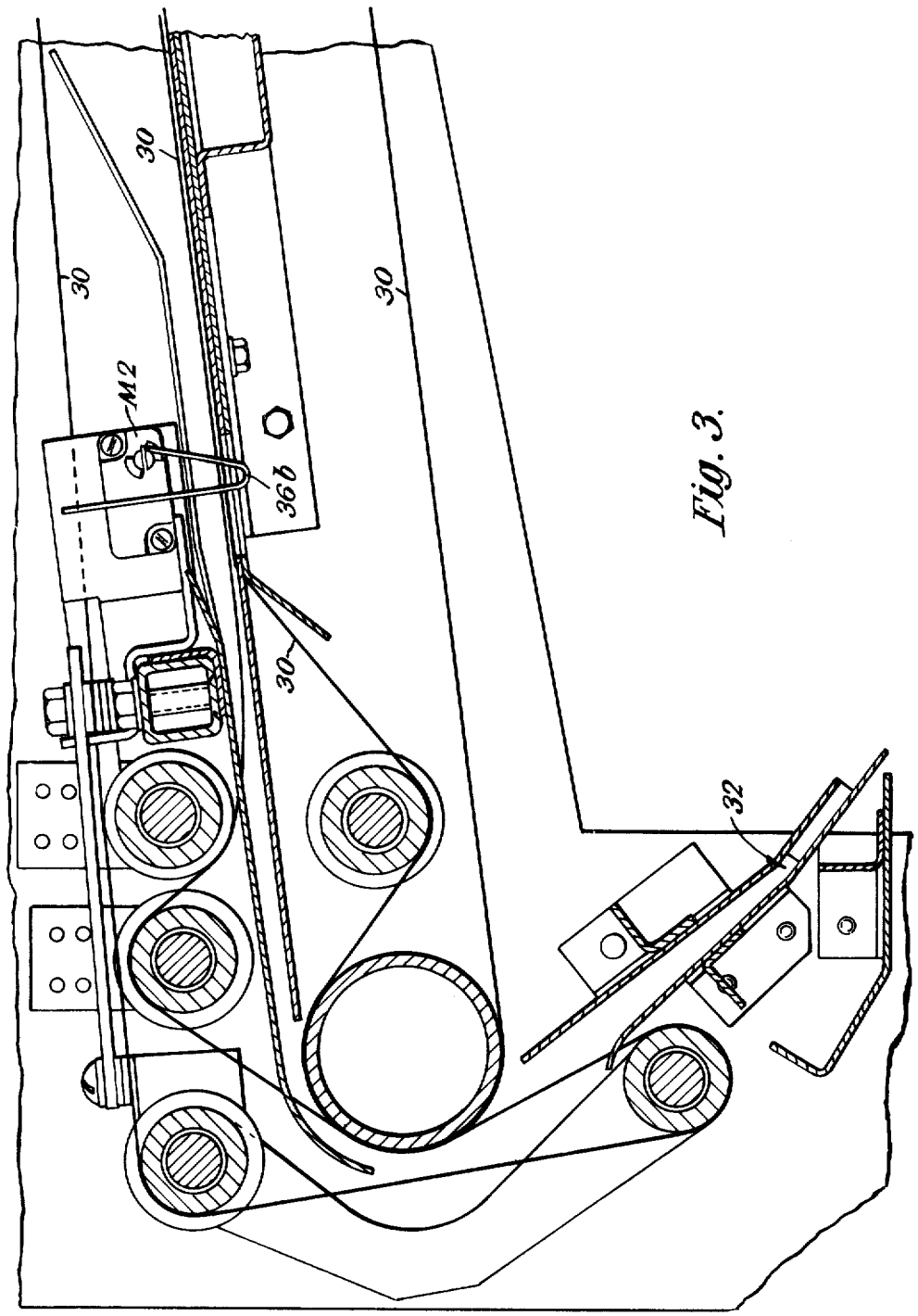
FIG. 3 is a section on the III—III of FIG. 2.
Figure 4:
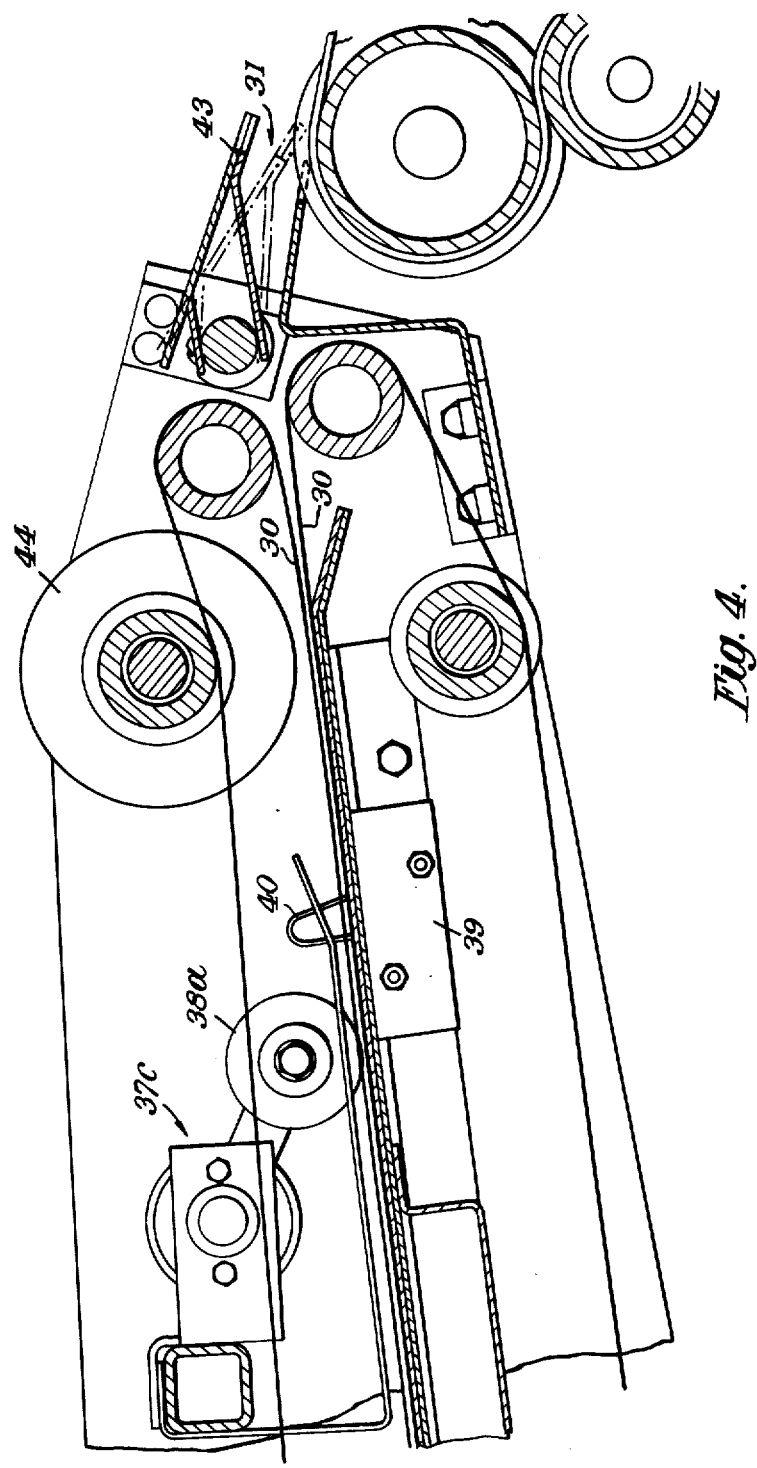
FIG. 4 is a section on the IV—IV of FIG. 2.

With reference now to FIGS. 2,3, and 4, the sheet feeding device 13 further comprises three microswitches M1, M2, M3 which are arranged normal to the direction of travel of the document through the device. As best seen in FIG. 3, each microswitch M1, M2, M3 includes a depending pivotal activating lever 36a, 36b, 36c. A braking device 37a, 37b, 37c is associated with each microswitch and includes a solenoid S1, S2, S3 and a rubber tyred wheel 38a, 38b, 38c rotatable about an axis normal to the direction of travel of the document and mounted for pivotal movement by its associated solenoid S1, S2, S3 about an axis parallel to the rotational axis. The wheels 38a, 38b, 38c are co-axial and are at laterally corresponding positions to their associated microswitches M1, M2, M3. The microswitches M1, M2, M3 only extend across a part of the width of the sheet feeding device 13 and a cut-out microswitch 39 is positioned beyond the third braking device 37c. The cut-out microswitch 39 has an upwardly extending activating lever 40.

Figure 5:
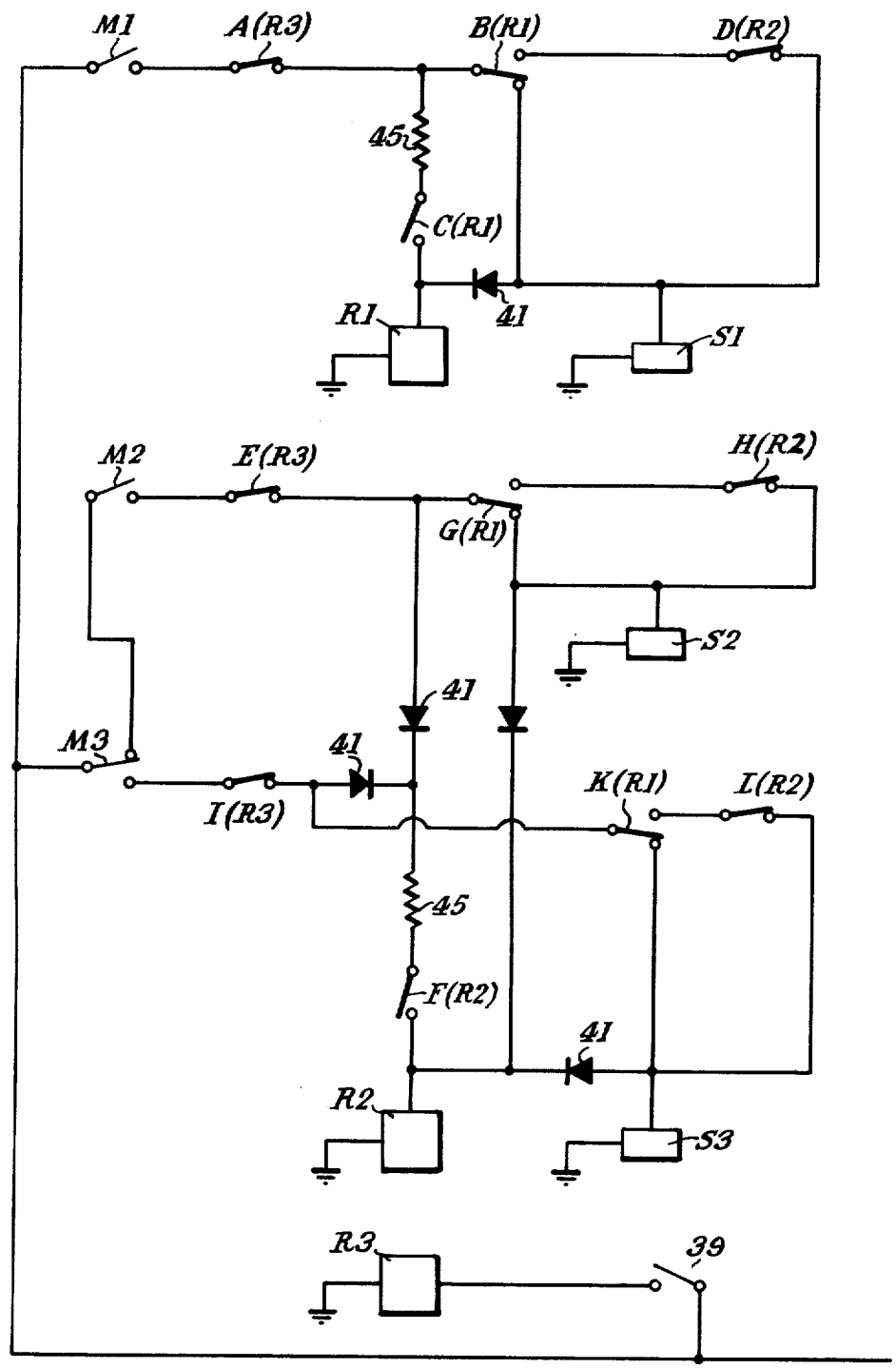
FIG. 5 is a circuit diagram of the sheet feeding device.

As best seen in FIG. 5, the microswitches M1, M2, M3 are associated with a control circuit which links the microswitches M1, M2, M3 with the solenoids S1, S2, S3 of their corresponding braking devices 37a, 37b, 37c. The circuit also includes first and second switch controlling relays R1, R2, whose function will be described below.

One terminal of the first microswitch M1 is connected to a normally closed switch A (R3) and to the solenoid S1 through a normally open path including a normally closed switch D(R2) and a normally closed path selected by a two position switch B(R1). The relay R1 is connected to the microswitch M1 either through the normally closed path and a diode 41 or through a normally open switch C(R1) and a resistor 45. One terminal of the second microswitch M2 is connected to one terminal of the third microswitch M3 so that the second microswitch M2 will only receive current when the third microswitch M3 is inoperative. The other terminal of the second microswitch M2 is connected to a normally closed switch E(R3) and to the solenoid S2 through a normally open path including a normally closed switch H(R2) or a normally closed path including a diode 41 the path being selected by a two position switch G(R1). The relay R2 is connected to the microswitch M2 either through the normally closed path or through a normally open switch F(R2), a resistor 45 and a diode 41.

The third microswitch M3 is connected to a normally closed switch I(R3) and to the solenoid S3 through a normally open path including a normally closed switch L(R2) or a normally closed path, the path being selected by a two position switch K(R1). The relay R2 is connected to the microswitch M3 either through the normally closed path and a diode 41 or through the normally open switch F(R2) the resistor 45 and a diode 41. The relay R1 controls the action of switches B(R1), C(R1), G(R1) and K(R1). Relay R2 controls switches D(R2), F(R2), H(R2) and L(R2).

In operation it has been found that even though the conveyor belts 30 are driven by a common drive, there is a tendency for substantially rectangular documents, particularly those of narrow width, to move so that their leading edge is not normal to their direction of travel. If the document is re-presented to the entry region 10 so dis-orientated it cannot be correctly mated with the copy paper and so an unsatisfactory copy is obtained.

If such a dis-orientated document enters the sheet feeding device 13, its leading edge will contact the activating lever 36a, 36b, 36c of one of the microswitches M1, M2, M3. First, it will be assumed that the lever 36a of the microswitch M1 is first contacted.

Activation of the microswitch M1 by the document activates the solenoid S1 and the relay R1. The activated relay R1 changes over switch B(R1), closes switch C(R1) and changes switches G(R1) and K(R1). Thus the relay R1 is activated independently of the solenoid S1 with the activation of the solenoid S1 dependant on the switch D(R2). The activated solenoid S1 lowers the wheel 38a onto the document which pivots about the wheel 38a until the leading edge contacts and activates the second microswitch M2. This serves to reorientate the document.

Thus the second solenoid S2 and the second relay R2 are activated. The relay R2 will open switch H(R2) which de-activates the solenoid S2. Thus the second roller 38b is only briefly lowered and does not alter the orientation of the document.

In addition, switch D(R2) is opened to de-activate the first solenoid S1 and switch L(R2) is opened. The switch F(R2) is closed to keep the second relay R2 activated. Thus the document is correctly orientated and proceeds.

If the microswitch M2 is the first activated, the solenoid S2 will be activated to lower the wheel 38b and cause re-orientation. In addition, the relay R2 will be activated to open switches D(R2), H(R2), L(R2) and close switch F(R2). The microswitch M1 will be the second contacted due to the position of the document adjacent the edge 50. This will activate the relay R1 and the solenoid S1. The wheel 38a will only be lowered briefly since the relay R1 will change over the two position switch B(R1) to de-activate the solenoid S1. In addition, the switch G(R1) will change to de-activate the second solenoid S2. The switch C(R1) will close to keep the relay R1 operative.

If the microswitch M3 is the first activated, the solenoid S3 will be activated to lower the wheel 38c and cause re-orientation of the document. The relay R2 will be activated to open switches D(R2), H(R2), L(R2) and close switch F(R2). The microswitch M2 will be inoperative and the microswitch M1 will be the next activated. This will activate relay R1 and solenoid S1. The wheel 38a will only be lowered briefly since the relay R1 will change over the two position switch B(R1) to de-activate the solenoid S1. In addition, the switches K(R1) will change to de-activate the third solenoid S3. The switch C(R1) will close to keep the relay R1 operative.

As the trailing edge of the document passes the microswitches M1, M2, M3 they are all opened and the relays R1 and R2 de-activated to return the control circuits to their starting positions.

If the document is of sufficient width, it will first contact the lever 40 of the cut-out microswitch 39. As shown in FIG. 5, this activates a relay R3 to open switches A(R3), E(R3) and I(R3) and disconnect the microswitches M1, M2, M3 from the control circuit.

It will be appreciated that the microswitches M1, M2, M3 are normal to the direction of travel of the document since this is the required orientation of the leading edge of the document. If other orientations are required the microswitches may be suitably aligned.

It will also be appreciated that additional microswitches and associated circuits and braking devices may be provided. These will have their circuits paired so that the solenoid of one circuit can be placed under the control of the other of the pair.

I claim:

1. In a photocopying machine having a sheet feeding mechanism for circulating an original through the machine to enable a plurality of copies to be made in succession upon individual copy sheets from said original, wherein the improvement comprises:
   a. a plurality of microswitches aligned in a row extending transversely to the direction of feed of the original by said sheet feeding mechanism and arranged for contact with the leading edge of the original;
   b. a plurality of correspondingly aligned normally inoperative solenoid operated brakes respectively disposed behind the individual microswitches in the direction of travel of the original; and
   c. an electrical control circuit operative in response to contact of the leading edge of the original with any one microswitch prior to contact of said leading edge with any other microswitch to cause the solenoid of the brake disposed behind the contacted microswitch to apply said brake to the original, and in response to subsequent contact of said leading edge with another microswitch, to cause said solenoid to disengage said brake from the original, thereby aligning the leading edge of said original with said microswitches.

2. A machine as claimed in claim 1, wherein each solenoid-operated brake comprises a wheel rotatable about an axis normal to the direction of travel of the original and adapted to be lowered onto the original upon activation of the solenoid of said brake.

3. A machine as claimed in claim 1, which includes a cut-out microswitch located behind said row of microswitches and laterally offset therefrom, said control circuit including means operative in response to contact of the leading edge of the original with said cut-out microswitch to disconnect from said control circuit all of the microswitches in said row.

* * * * *